(12) United States Patent
Hu

(10) Patent No.: US 11,455,682 B2
(45) Date of Patent: Sep. 27, 2022

(54) INSTANT BANK ACCOUNT VERIFICATION THROUGH DEBIT CARD NETWORK

(71) Applicant: PAYPAL, INC., San Jose, CA (US)

(72) Inventor: Qilin Hu, Cupertino, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/101,598

(22) Filed: Nov. 23, 2020

(65) Prior Publication Data
US 2021/0182957 A1  Jun. 17, 2021

Related U.S. Application Data

(63) Continuation of application No. 13/150,889, filed on Jun. 1, 2011, now Pat. No. 10,846,789.

(51) Int. Cl.
*G06Q 40/02* (2012.01)
*G06Q 20/10* (2012.01)

(52) U.S. Cl.
CPC ........... *G06Q 40/02* (2013.01); *G06Q 20/108* (2013.01)

(58) Field of Classification Search
CPC .............................. G06Q 40/02; G06Q 20/108
See application file for complete search history.

(56) References Cited

U.S. PATENT DOCUMENTS

| | | | | |
|---|---|---|---|---|
| 6,021,397 A * | 2/2000 | Jones | ..................... | G06Q 40/06 705/36 R |
| 7,395,241 B1 * | 7/2008 | Cook | ..................... | G06Q 20/40 705/40 |
| 8,078,516 B1 * | 12/2011 | Weiss | ..................... | G06Q 40/02 705/35 |
| 8,820,638 B1 * | 9/2014 | Cotter | ..................... | G06Q 40/02 235/382 |
| 2001/0042785 A1 * | 11/2001 | Walker | ..................... | G06Q 20/10 235/379 |
| 2003/0145205 A1 * | 7/2003 | Sarcanin | ............ | G06Q 20/3821 713/172 |
| 2004/0117302 A1 * | 6/2004 | Weichert | ............ | G06Q 20/1085 705/40 |
| 2007/0061254 A1 * | 3/2007 | Blunck | ................... | G06Q 20/10 705/39 |
| 2009/0037995 A1 * | 2/2009 | Zapata | ..................... | G06F 21/43 726/9 |
| 2009/0216651 A1 * | 8/2009 | Ghafoor | ................... | G07F 19/20 705/17 |
| 2010/0145860 A1 * | 6/2010 | Pelegero | ............... | G06Q 20/367 705/44 |
| 2011/0099108 A1 * | 4/2011 | Fung | ..................... | G06Q 30/06 705/44 |
| 2011/0238469 A1 * | 9/2011 | Gershman | ............. | G06Q 20/04 705/14.17 |

* cited by examiner

*Primary Examiner* — Mike Anderson
*Assistant Examiner* — Paul R Kloberg
(74) *Attorney, Agent, or Firm* — Haynes and Boone, LLP (57) ABSTRACT

A bank account can be authenticated or confirmed by a user providing an account number and a debit card number. The payment provider then obtains user account information from the bank through a debit card network. The payment provider authenticates the account if the account numbers match. In another embodiment, authentication further requires a portion of a current bank balance in the account provided by the user to match the current balance received from the bank.

21 Claims, 6 Drawing Sheets

Confirm your bank account

For your security, we need to confirm that you are the owner of this Bank of America (All except WA & ID) account.

Secure Transaction

Confirm instantly

Enter your online banking login information

Note: PayPal will not save this information

Online ID
[                    ]

Passcode
[                    ]

Verify Passcode
[                    ]

By clicking Confirm Instantly, I agree to the instant bank account confirmation terms and conditions.

[ Confirm Instantly ]

FIG. 3A

Confirm in 2-3 days

PayPal makes 2 small deposits (less than $1.00 USD) into your bank account. You'll need to:

1. Check your bank account in 2-3 business days for the exact amounts.

2. Log in to your PayPal account.

3. Click Confirm Bank Account from your Account Overview and enter the 2 deposit amounts.

[ Confirm in 2-3 days ]

INSTANT BANK ACCOUNT VERIFICATION THROUGH DEBIT CARD NETWORK

CROSS REFERENCE TO RELATED APPLICATION

The present invention is a continuation of U.S. patent application Ser. No. 13/150,889, filed Jun. 1, 2011, which is incorporated herein by reference in its entirety.

BACKGROUND

Field of the Invention

The present invention generally relates to financial transactions, and in particular, to confirming or verifying a user's account at a financial institution.

Related Art

Online shopping is becoming more and more popular with consumers, due in large part to convenience. Consumers can purchase items from their home, office, or even their mobile devices. Payments can be handled online as well, such as through payment providers like PayPal, Inc. of San Jose, Calif. Such payment providers process payments between parties and typically offer both security and consumer protection. However, in order to use these services, a consumer is required to have an account with the payment provider, where the user account is funded, debited, or credited as needed by the payment provider.

In order for a user, e.g., a buyer or a seller, to use the services of a payment provider, the user typically must first establish an account with that payment provider, and if the service provider, acting on behalf of the user, is to withdraw funds from or deposit funds to a user's account at a third party financial institution, e.g., a bank, the payment provider must first verify at least the existence and the user's ownership of that account.

Verification of a user's third-party deposit or credit account at a financial institution can be accomplished in a number of ways, including "random deposit account verification," online banking screen scraping, and by way of third party, fee-for-service verification services. However, these methods can be slow and less secure, and in any case, are relatively expensive. For example, with random deposit, the process may take two to three business days before the account can be verified, due in part to the delay in the random deposit appearing in the user's account at the third party financial institution. With online banking screen scraping, users may be unwilling to provide online banking credentials for security reasons.

A need therefore exists for systems for instantly verifying the existence and ownership of a user's account at a bank or other financial institution that are less complex and expensive and more secure than those of the prior art.

Therefore, a need exists for the ability to instantly verify the existence and ownership of a user's account at a bank or other financial institution without the disadvantages of current methods and systems.

SUMMARY

In accordance with one embodiment of the present invention, a user's bank account is confirmed by matching the last four digits of bank account number queried through debit card network with the bank account number input by the user and matching the decimal balance of the user's bank account retrieved through debit card network with the decimal balance entered by the user. When the user is requested to confirm the user's bank account, such as when the account is used by a payment provider for opening a user account with the payment provider, the user may first enter an ATM or debit card number associated with the user's bank account and the current decimal portion of the balance in the account (i.e., only the cents portion of the balance). The user may need to first access the user's bank account, through the banking site, to obtain the decimal portion of the balance.

Using the received user debit card number, the payment provider then queries the last four digits of the user's bank account number and the current balance through a debit card network, such as Star or Interlink. The payment provider receives the requested information and compares whether the last four digits match the user's account number. If so, the payment provider determines whether the user account balance has the same two decimal numbers as what the user entered previously. A match allows the payment provider to authenticate or confirm the user's bank account.

In another embodiment, the current balance information is not needed. The user only needs to supply the ATM or debit card number. Account verification is then accomplished by matching all or a portion of the user's bank account information with information provided by the user and by the user's bank.

As a result, the payment provider can confirm a bank account quickly and easily, without the user having to enter sensitive account access information.

These and other features and advantages of the present invention will be more readily apparent from the detailed description of the embodiments set forth below taken in conjunction with the accompanying drawings.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Figure 1:
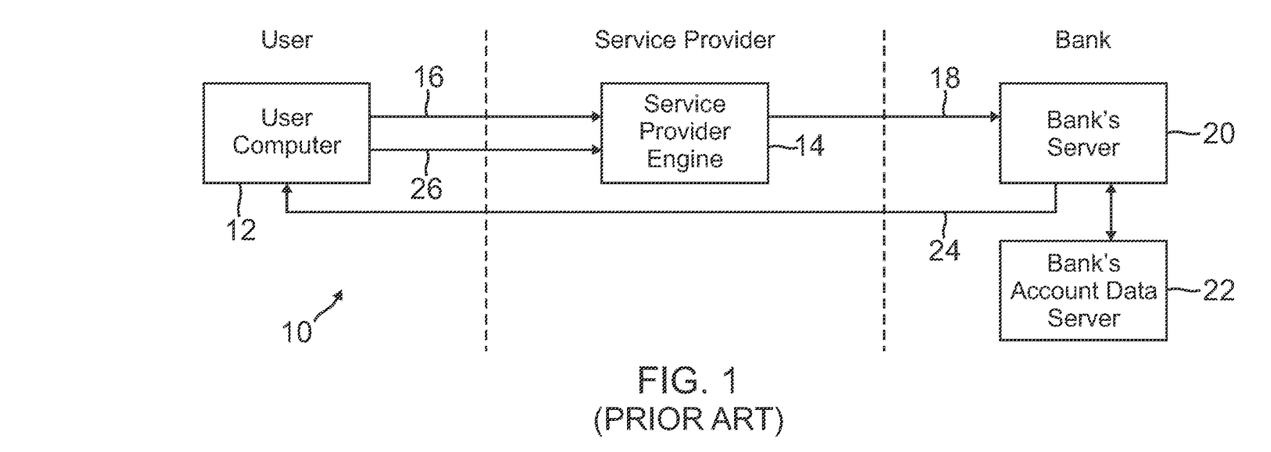
FIG. 1 is a block diagram showing a conventional random deposit account verification system.

FIG. 1 is a block diagram showing a conventional random deposit account verification system 10. A user who is attempting to get an account verified typically employs a computer 12, e.g., a personal computer (PC) running a web browser application, or other computing device to log onto a web page provided by a web page engine or server 14 of the payment or service provider. The user may be requested to provide the user's financial account information, such as a bank account and/or routing number of the user's bank. The user then sends a request or instruction 16 to the service provider to verify the account with a random deposit. In response, the service provider proceeds to make one or more deposits 18 to the account identified by the user, which may be effected electronically, e.g., through the Automated Clearing House (ACH) network via an Electronic Funds Transfer (EFT) server 20 of the bank.

Each deposit is typically less than a dollar, is made at random times and in random amounts, over a specified period of time, typically several days after the user provides the account information to the service provider. The bank credits the identified account with the deposits, records the amounts and dates of the deposits in the bank's account data server 22, and reports the dates and amounts of the deposits to the user, which may be by way of a conventional monthly paper statement mailed out by the bank, or alternatively, if the user has established "online banking" with the bank, by means of account data 24 downloaded from the bank's online banking web page server 20. After the deposits appear in the user's account, the user again logs onto the service provider server 14 and sends a message 26 to the service provider confirming the amount and/or date of the random deposits, thereby verifying the existence and ownership of the account.

However, such a system can take time (several days) and may require the user to proactively access the bank account and respond to the service provider. If the user does not have online backing, the process may take up to a month or more if the user has to wait for a paper statement to arrive from the bank.

Figure 2:
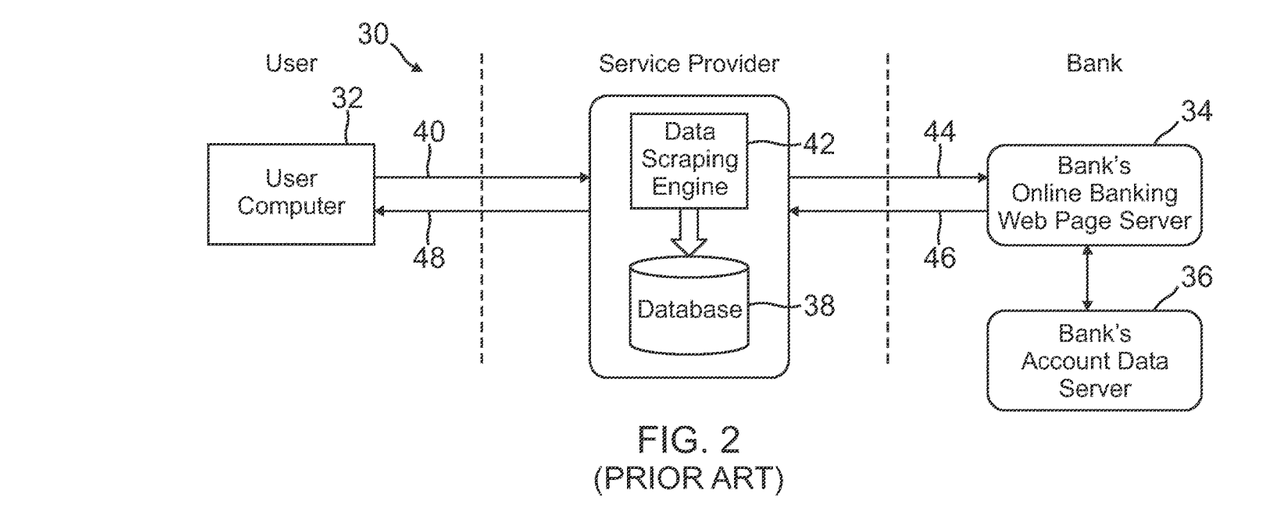
FIG. 2 is a block diagram showing a conventional instant account verification system.

FIG. 2 is a block diagram showing a conventional instant account verification system 30, where account verification is much faster than with the system of FIG. 1. This system may be available only where the user has previously established online banking with the bank or other financial institution, in which the user, as above, accesses the bank account via a web browser, or more typically, via a so-called "web scraping" application, such as Yodlee's online application, MoneyCenter, or Intuit's Quicken or QuickBooks, or Microsoft's Money, running on a computer 32 of the user. Web scraping applications process the hypertext markup language (HTML) of the web pages from a bank's web server 34 to extract financial data from a bank's account data server 36, almost universally formatted and transmitted from the account server. This may be through the Open Financial Exchange (OFX) financial data-stream specification. The system then converts it to another format useful to the user, thereby simulating the user accessing the bank's web site via a web browser application.

With system 30, the user typically logs onto the service provider's web server through computer 32 or other computing device and provides the service provider with the user's online banking login credentials (e.g., user name and password/PIN), in addition to the financial institution account information described above. The service provider may store the user's online banking login credentials in a local database 38, or alternatively, may only hold them temporarily in a memory device for a one-time verification use, after which they are erased or discarded.

The user then sends an instruction 40 to the service provider to verify the account. In response, the service provider retrieves the user's login credentials. Using a web scraping server and application or an "engine" 42, the user's login credentials are used to simulate the user to establish a web page connection 44 with the bank's web page server 34 and download account data 46 from the bank's account data server 36. As a result, the existence and ownership of the account is verified. The service provider may also send a message 48 to the user that the account has been verified.

However, while this system is faster, it is less secure, as the user is required to enter online banking access information into the service provider system, which the user may be reluctant to do, and such information may be comprised or intercepted by unwanted parties or systems. This system may not even be available to a user if the user does not have online banking with the user's bank.

To remedy the above deficiencies, embodiments of the present invention allow a user account to be verified by the user entering only a debit/ATM card number and the decimal portion of the user's bank account balance. This information is used by the service/payment provider to retrieve at least a portion of the user's bank account number and at least the decimal portion of the user's bank account balance through a suitable network, such as a debit card network. A matching number for the decimal portion balance verifies the existence and user access of the account. This verification can be done in real time and virtually instantaneous without the user having to enter sensitive login information.

Figure 3A:
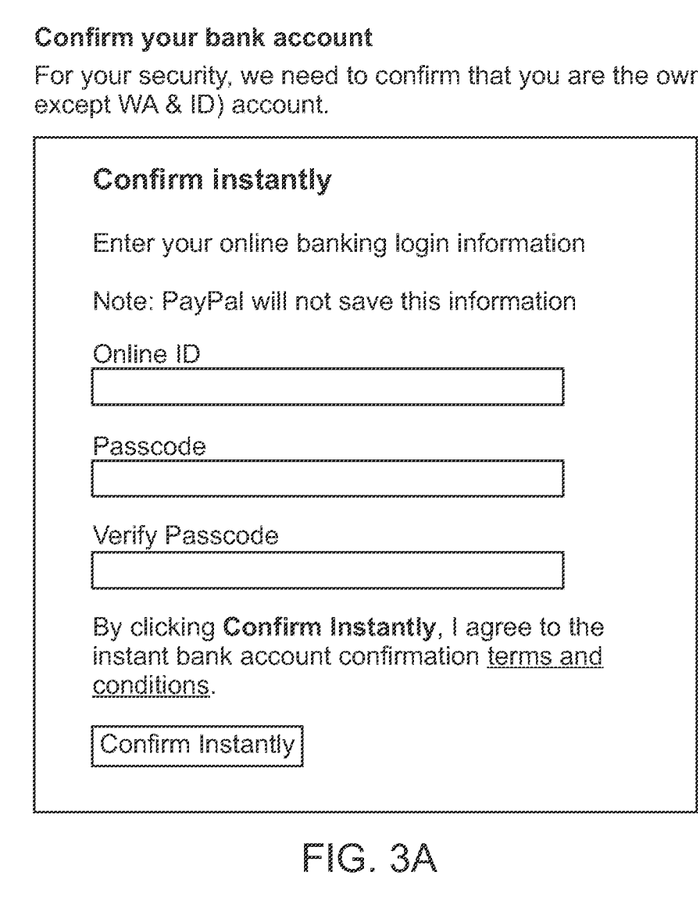
FIGS. 3A and 3B are portions of sample screen shows showing two conventional account verification options.
Figure 3B:
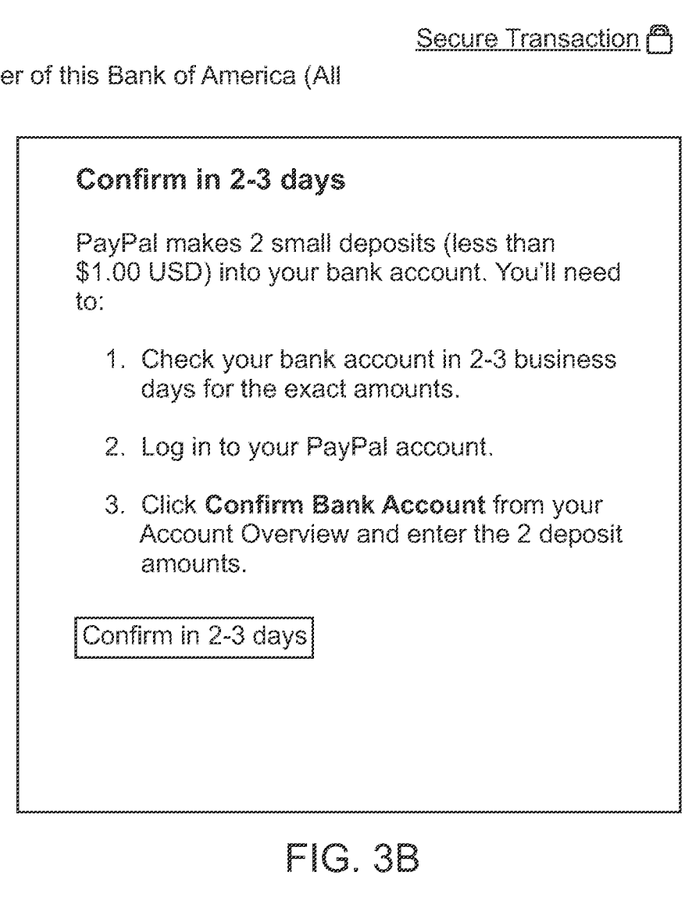

FIGS. 3A and 3B are exemplary screen shots for the verification systems of FIGS. 2 and 1, respectively, discussed above. In FIG. 3A, the user is asked to provide an online user identifier, such as a user name, email, or other identifier used to identify the user's account with the user's online banking system. The user is also asked to provide and re-enter a passcode used to access the user's online banking account through the bank's website. The passcode may be a password, PIN, or other confidential code. This method allows an account to be confirmed instantly. However, to achieve this, the user is required to enter sensitive information, such as the user's passcode. The user may be hesitant or unwilling to enter such information, especially if the passcode is also used to access other user accounts or sites. The net result is that the user may forego entering this information and decide to not open an account with the payment provider.

In FIG. 3B, the user is provided information and instructions for the random deposit method. As seen, the user needs to wait two to three days (it can be more), check the user's bank account to see if the random deposits have been made (which may take several attempts), log into the payment provider account after the user sees the deposits, and enter the amounts to confirm. Clearly, this requires an effort from the user. In addition, the user has to wait for confirmation, which may cause the user to forego a purchase with the payment provider. Furthermore, the user may forget to check the bank account and may end up not completing the verification process, resulting in not opening an account with the payment provider.

Figure 4:
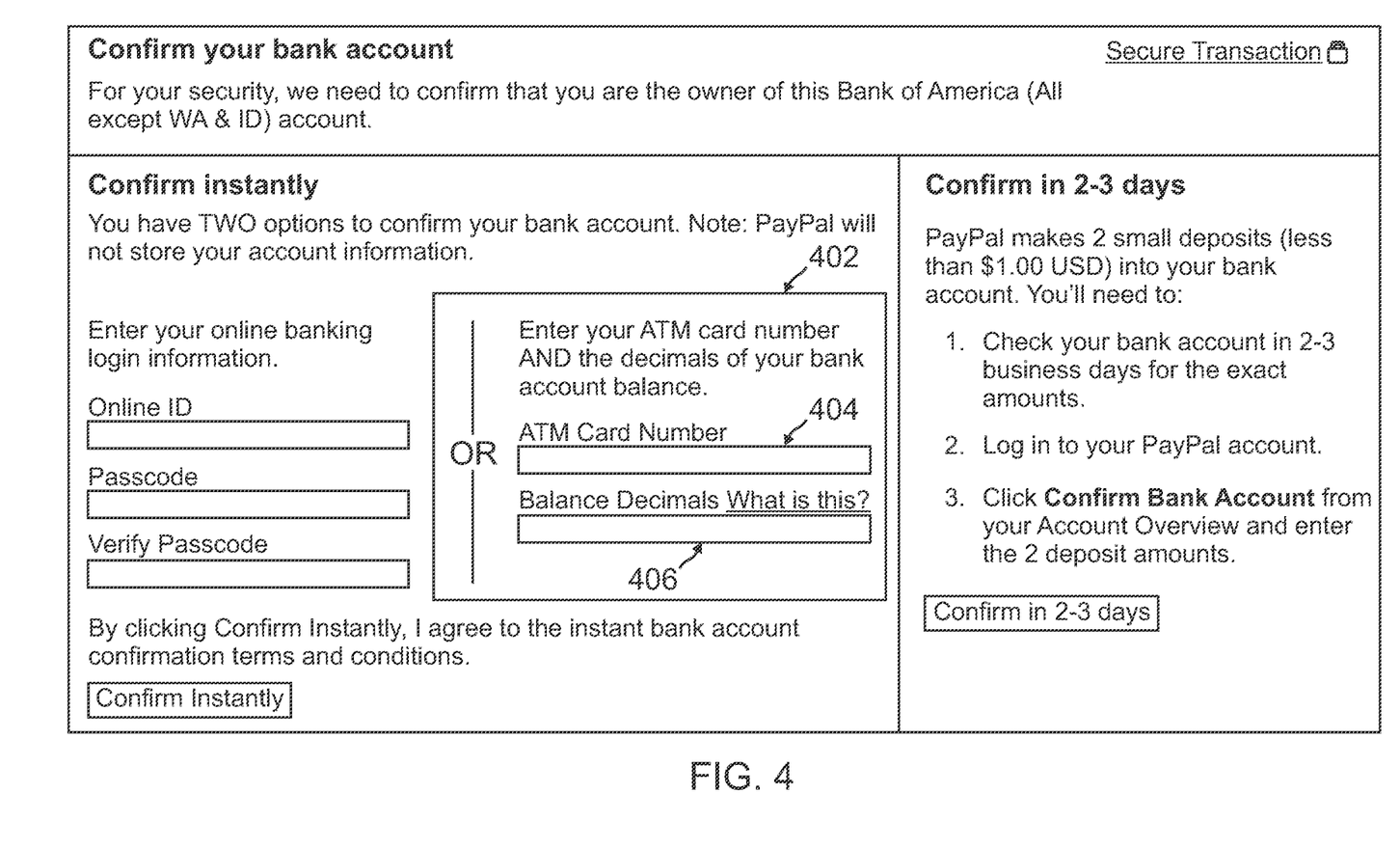
FIG. 4 is a screen shot for an instant bank account confirmation according to one embodiment of the present invention.

FIG. 4 is an exemplary screen shot showing the user a new option for verifying or confirming a bank account, according to one embodiment. The screen shot is shown to the user by the payment provider, such as PayPal, Inc. of San Jose, Calif., during the process of the user signing up or opening an account with the payment provider. Previous to the screen shot, the user has already entered the user's bank account information, such as an account number and routing number.

The screen shot shows the known instant account verification requiring online banking access information on the left and the known random deposit account verification requiring a delay on the right. The new method is shown within box 402, which is within the section for instant confirmation. Box 402 includes a field 404 requesting the user to enter an ATM card number and a field 406 requesting the user to enter balance decimals. The ATM card may be a debit card associated or linked with the user's bank account. The balance decimals, in one embodiment, is the decimal portion of the user's bank account balance. Other portions of the user's account balance may be requested in different embodiments. For example, the user may be requested to enter the dollar portion, the entire balance, or some other information about the current balance.

The user may obtain the requested information in any suitable matter. Typically, the user will access the user's bank account, such as by opening a new window on the user's computing device and logging into the user's bank account. The user can then view the current balance and enter the requested information in field 406 during the session with the payment provider. In other words, the user can "instantly" complete the fields with the requested information during the account sign-up or activation process with the payment provider. Once the information is entered, the user can select a "confirm instantly" link or button 408 to send the information for processing by the payment provider. If the information is confirmed by the payment processor, which may just take a few seconds, the user may be notified immediately that the bank account is confirmed, and the user account opened and active. The notification may take place during the same session.

Figure 5:
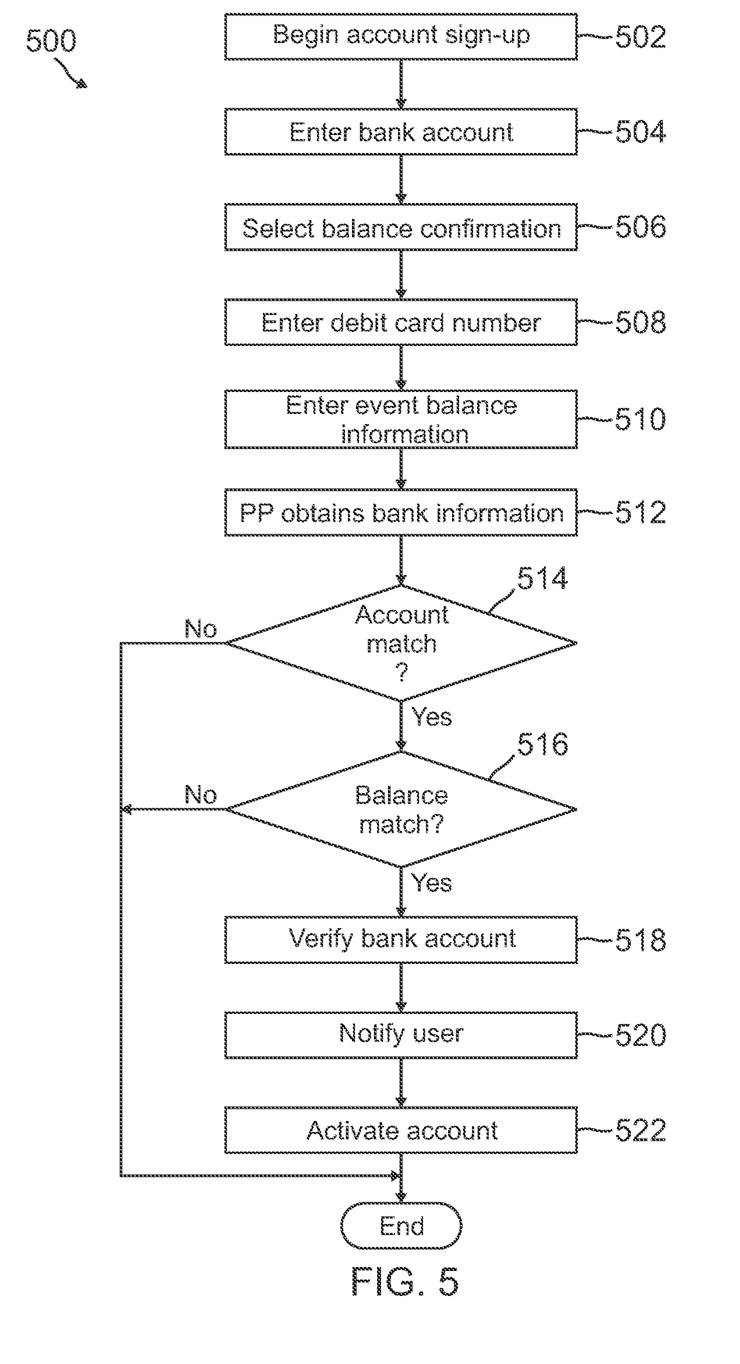
FIG. 5 is a flowchart showing a process for instantly confirming a user's bank account according to one embodiment.

FIG. 5 is a flowchart 500 showing a process for instantly confirming a user's bank account according to one embodiment. At step 502, the user begins an account sign-up or activation process with the payment provider. This may include the user, through a user device such as a PC, smart phone, laptop, tablet, or other computing device, accessing the payment provider site (such as through a browser or App), indicating a desire to open or activate an account with the payment provider, and entering requested information. The information may include the user's name, address, phone number, email address, user name, password, PIN, answers to security questions, and any other requested information.

Another type of requested information may be a bank account number or other funding source for the user's account. This is typically required to open an account to ensure the user has a funding source to pay for charges incurred from the account or credit issued for the account. Existence of a bank account or funding source may also be part of verifying a non-fraudulent user. Thus, at step 504, the user enters, by request of the payment provider, an account number at a user's bank or another account number of a user funding source. The user may be asked to enter additional information, such as the bank name, local branch address, routing number, etc. The requested information may be entered through the user device or other devices by manually typing in the account number, by voice, by scanning or photo, or other methods. The user may be asked to re-enter the information for accuracy.

Once the requested information is received by the payment provider, such as electronically through a wired or wireless communication, the payment provider may present the user with options for confirming or verifying the user's bank or funding account. The screen or options the user sees may be one similar to that in FIG. 4. Here, the user is given the option of three ways to confirm the bank account. The user chooses instant confirmation using the user's account balance (box 402 in FIG. 4), at step 506. Note that the user does not need to do anything in the step, but just making the decision to use that option. In other embodiments, the user may actively select the bank balance option, which the payment provider receives. In response, the payment provider presents the user with requested fields to fill in.

At step 508, the user enters the user's debit card number, such as by typing, vocalizing, or other means, into an input of a user device. The debit card number is associated with the user's bank account and can be used to withdraw money from the user's account through ATMs and other cash-dispensing machines through debit networks, such as Star and Interlink. The debit card number may also be a credit card number, which allows the user to use that same number as a credit card.

Next, at step 510, the user enters current balance information of the user's bank account associated with the entered debit card number. In one embodiment, the balance information is the decimal portion of the current balance. In other embodiments, different portions of the current balance may be entered (if requested by the payment provider), such as only the last decimal digit, the last three digits, the digit corresponding to the single dollar portion, etc. The user typically will be required to access the user's bank account right before this step. For example, when the user is requested to enter the decimal portion, the user may open another window on the user device, access the user's online bank account, and view the current balance. The user may obtain this information in other ways as well, such as calling a bank number and speaking with an agent or going through an IVR process.

Once entered, the user's debit card number and current balance information is communicated to the payment provider. Note that the information entered in steps 508 and 510 may be communicated to the payment provider sequentially or at the same time.

Using the receiving information, the payment provider obtains information about the user's account at step 512. In one embodiment, the payment provider sends a request to the user's bank through a debit card network, such as Interlink, Alert, Sirius, Plus, and Star. Other means to communicate with the user's bank may also be suitable. In one embodiment, the payment provider requests the last four digits of the user's bank account and the current balance by using the user provided debit card number. In other embodiments, the payment provider may request and/or receive other information about the user's bank account, such as the whole bank account number, other portions of the bank account number, the whole current balance, and/or other portions of the user's current balance.

After the payment provider receives the requested information from the user's bank about the user's account information and the user's current balance, a determination is made, at step 514, whether the account information matches. In the above embodiment, the payment provider determines if the last four digits of the account number provided by the user at step 504 matches the four digits received from the bank at step 512. Note that other numbers may be used for matching to determine whether the user provided account information matches with account information from the bank.

If there is no match, the authentication process may end. However, in other embodiments, the user may be requested to re-enter bank account information, debit card information, or new information. For example, the user may have entered an incorrect bank account number, resulting in a mismatch due to the user-provided debit card number returning the user's correct account number. The user may also have entered an incorrect debit card number, also resulting in a mismatch due to incorrect debit card number returning an incorrect user account number. If the user re-enters or enters new information, the account information is again matched at step 514.

If the account information matches, indicating the debit card information matches to the user's account, a determination is made, at step 516, whether the current balance information matches. If the user entered the decimal portion of the current account balance, a determination is made whether the two decimal portions match what was received by the bank. Other portions of the current balance can also be used for step 516, such as the dollar portion or the ten dollar portion.

If the current balance information does not match, the process may end. However, like with the account matching step, the user may be asked to re-enter the current balance information. For example, the user may have entered the number incorrectly, or the balance may have changed between the time the user last checked the balance and when the payment provider queried the bank. Thus, the user may access the user's bank account again, such as online during the session, and see what the current balance is. The user can then enter the balance information for the payment provider to check again, at step 516.

Steps 514 and 516 may be performed at the same time, such that if either the account or the balance information does not match, the user is requested to enter or re-enter information for one or both.

Once the account and current balance information are matched, the payment provider verifies the bank account at step 518. Matching the information confirms to the payment provider that the user has access to the account associated with user-input bank account number.

At step 520, the user may be notified that the bank account has been verified and/or the user's account with the payment provider activated. The payment provider may send a notification to the user during the session through the same user device or another user device. In one embodiment, the user will see a message on a screen after the user submits the requested information.

The payment provider activates the user's account, at step 522. The user can then use the payment provider services and make purchases and conduct other financial transactions through the payment provider and the user account, even during the same session as the above account verification process. As a result, the user can quickly and easily get a bank account verified/confirmed and begin using the account essentially immediately, without having to wait for random deposits or enter sensitive online banking credentials.

In another embodiment, the user does not need to provide current account balance, such as the decimal portion of the account balance. This eliminates the need for the user to have to access the user's bank account to obtain current balance information. User account verification or authorization is performed by using only the user's bank account number. Thus, in this embodiment, the steps may be the same or similar to those described above, but without steps and/or decisions involving the user's current account balance. For example, the user's account may be verified by matching only the last four digits (or other portions) of the user's bank account received from the user's bank through the debit card network with the account number provided by the user to the payment provider.

Figure 6:
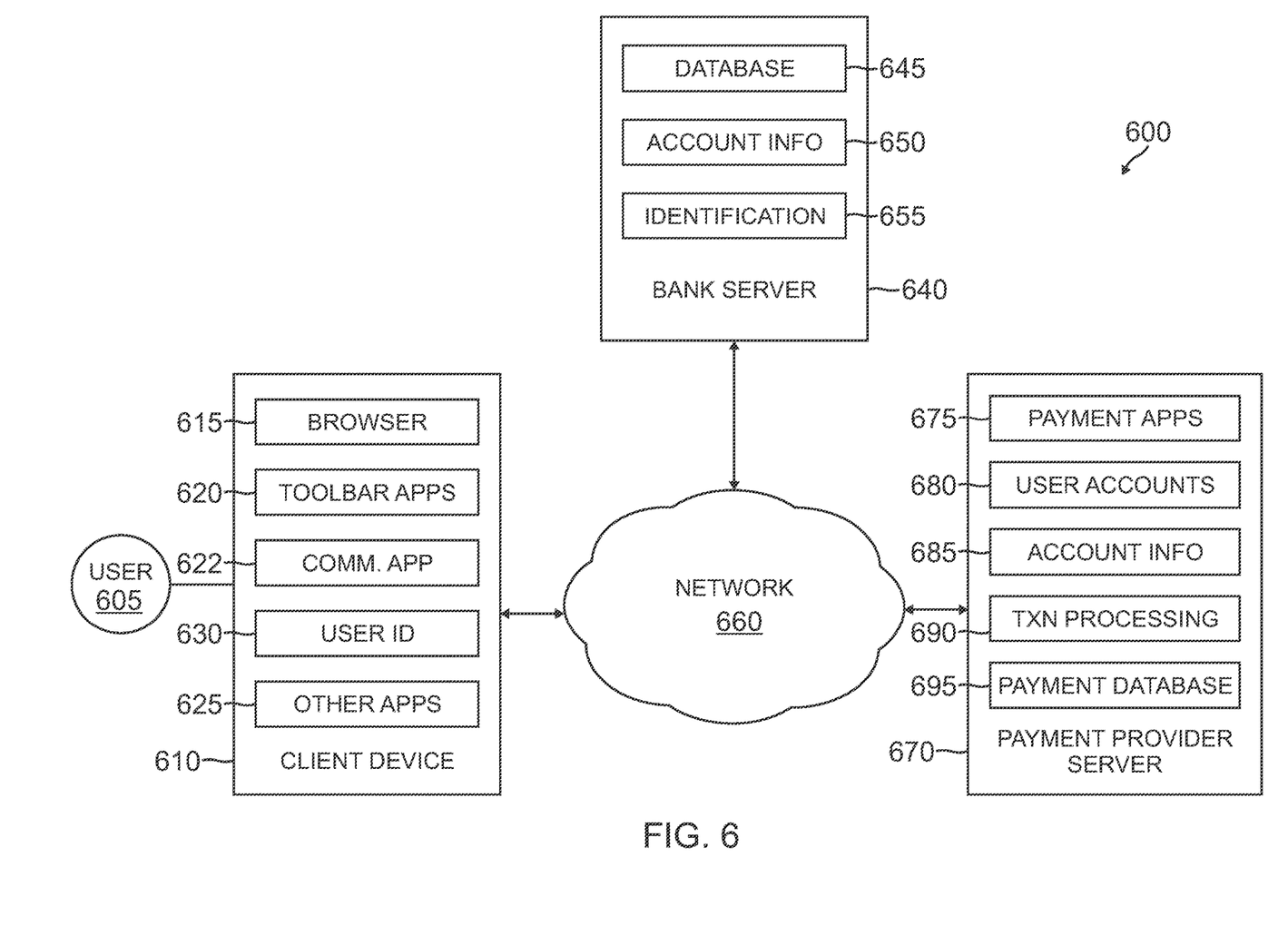
FIG. 6 is block diagram of a networked system suitable for implementing the process of FIG. 5 according to an embodiment.

FIG. 6 is a block diagram of a networked system 600 configured to handle an account verification/confirmation process between a user and a payment provider, such as described above, in accordance with an embodiment of the invention. System 600 includes a user or client device 610, a bank server 640, and a payment provider server 670 in communication over a network 660. Payment provider server 670 may be maintained by a payment provider, such as PayPal, Inc. of San Jose, Calif. A user 605 utilizes user device 610 to perform steps to activate/sign up an account with the payment provider, including authenticating or verifying a user bank account, as described above.

User device 610, bank server 640, and payment provider server 670 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660.

Network 660 may be implemented as a single network or a combination of multiple networks. For example, in various embodiments, network 660 may include the Internet or one or more intranets, landline networks, wireless networks, and/or other appropriate types of networks. Network 660 may include one or more debit networks, such as Star or Interlink.

User device 610 may be implemented using any appropriate hardware and software configured for wired and/or wireless communication over network 660. For example, in one embodiment, the user device may be implemented as a personal computer (PC), a smart phone, personal digital assistant (PDA), laptop computer, and/or other types of computing devices capable of transmitting and/or receiving data, such as an iPad™ from Apple™.

User device 610 may include one or more browser applications 615 which may be used, for example, to provide a convenient interface to permit user 605 to browse information available over network 660. For example, in one embodiment, browser application 615 may be implemented as a web browser configured to view information available over the Internet. User device 610 may also include one or more toolbar applications 620 which may be used, for example, to provide client-side processing for performing desired tasks in response to operations selected by user 605. In one embodiment, toolbar application 620 may display a user interface in connection with browser application 615 as further described herein. Tool bar application 620 may also have tabs that allow the user to open new browser windows, such as to access the user's online bank account.

User device 610 may further include other applications 625 as may be desired in particular embodiments to provide desired features to user device 610. For example, other applications 625 may include security applications for implementing client-side security features, programmatic client applications for interfacing with appropriate application programming interfaces (APIs) over network 360, or other types of applications. Applications 625 may also include email, texting, voice and IM applications that allow user 605 to send and receive emails, calls, and texts through network 660, as well as applications that enable the user to make perform transactions through the payment provider as discussed above. User device 610 may include one or more user identifiers 630 which may be implemented, for example, as operating system registry entries, cookies associated with browser application 615, identifiers associated with hardware of user device 610, or other appropriate identifiers, such as used for payment/user/device authentication. In one embodiment, user identifier 630 may be used by a payment service provider to associate user 605 with a particular account maintained by the payment provider as further described herein. A communications application 622, with associated interfaces, enables user device 610 to communicate within system 600.

Bank server 640, in this embodiment, is associated with or managed by a bank or other financial institution where the user has an account. Bank server 640 may also be operated by or associated with a third party managing data for the financial institution. Bank server 640 has a database 645, such as memory, that can store information related user accounts, such as account information 650, user identity information, and user device information. Account information 650 may include user names, user names, email address, aliases, passwords, PINs, account numbers, debit card numbers associated with account numbers, balances of different user accounts, credit lines, credit limits, type of account, conditions for an account, account statements, account activity, etc.

An identification application 655 verifies the identity of users attempting to access account information. This may include confirming a user's login credentials, such as a user name and password, along with security questions/answers and other fraud or identity checks. The identification application 655 may also determine whether the identity of a user device is authentic or fraudulent, e.g., when a user is attempting to access an account on an unknown device. The identification application 655 may communication with database 645 and/or account information 650 as part of processing.

Payment provider server 670 also maintains a plurality of user accounts 680, each of which may include account information 685 associated with individual users. For example, account information 685 may include private financial information of users of devices such as account numbers, passwords, device identifiers, user names, phone numbers, credit card information, bank information, account restrictions, and/or other financial information which may be used to facilitate transactions by user 605. Advantageously, payment application 675 may be configured to interact user device 610 to process financial or payment transactions on behalf of user 605.

A transaction processing application 690, which may be part of payment application 675 or separate, may be configured to receive information from user device 605 and/or bank server 640 for processing and storage of data in a payment database 695. Transaction processing application 690 may include one or more applications to process information from user 605 and/or bank server 640 for opening or activating a user account, including confirming/verifying a bank account associated with the user as described herein.

Figure 7:
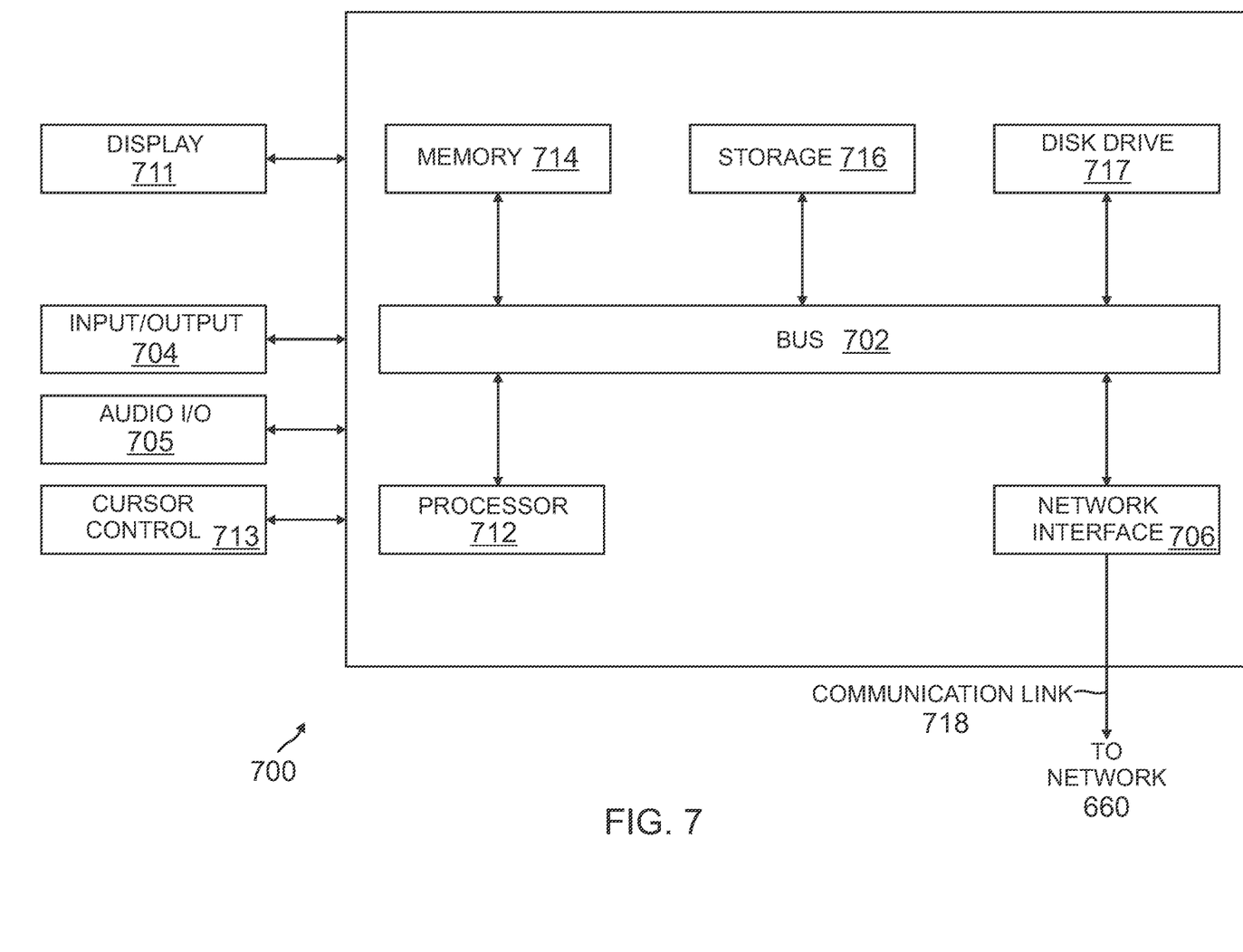
FIG. 7 is a block diagram of a computer system suitable for implementing one or more components in FIG. 6 according to one embodiment of the present disclosure.

FIG. 7 is a block diagram of a computer system 700 suitable for implementing one or more embodiments of the present disclosure. In various implementations, the user device may comprise a personal computing device (e.g., a personal computer, laptop, smart phone, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons or links, etc., and sends a corresponding signal to bus 702. I/O component 704 may also include an output component, such as a display 711 or printer and a cursor control 713 (such as a keyboard, keypad, mouse, etc.). An optional audio input/output component 705 may also be included to allow a user to use voice for inputting information by converting audio signals. Audio I/O component 705 may allow the user to hear audio. A transceiver or network interface 706 transmits and receives signals between computer system 700 and other devices, such as another user device, a bank server, or a payment provider server via network 660. In one embodiment, the transmission is wireless, although other transmission mediums and methods may also be suitable. A processor 712, which can be a micro-controller, digital signal processor (DSP), or other processing component, processes these various signals, such as for display on computer system 700 or transmission to other devices via a communication link 718. Processor 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor 712 and other components by executing one or more sequences of instructions contained in system memory component 714. Logic may be encoded in a computer readable medium, which may refer to any medium that participates in providing instructions to processor 712 for execution. Such a medium may take many forms, including but not limited to, non-volatile media, volatile media, and transmission media. In various implementations, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
  receiving, by a computer system of a service provider from a user device associated with a user, a request for activating a user account of the user with the service provider based on a funding account of the user with an institution different from the service provider, wherein the request comprises a first number that identifies the funding account;
  selecting, by the computer system from a plurality of digit positions, one or more digit positions for authenticating the funding account of the user;
  in response to receiving the request, providing, by the computer system on the user device, a graphical user interface (GUI) comprising a first area for the user to submit a second number associated with the funding account and a second area for the user to submit one or more digits corresponding to the selected one or more digit positions of a current account balance associated with the funding account;
  receiving, by the computer system via the GUI, the second number and the one or more digits associated with the funding account;
  querying, by the computer system and based on the second number, a debit card network associated with the institution, for an account number and the current account balance associated with the funding account;
  receiving, by the computer system from the debit card network, the account number and the current account balance associated with the funding account;
  extracting, by the computer system from the received current account balance, one or more digits corresponding to the selected one or more digit positions;
  authenticating, by the computer system, the funding account of the user by determining the first number included in the request matches the account number received from the network and the one or more digits received from the user match the one or more digits extracted from the current account balance without requiring the user to provide to the service provider user credentials for logging in to the funding account with the institution;
  in response to authenticating the funding account, activating, by the computer system, the user account by linking the funding account with the institution to the user account with the service provider;
  receiving, by the computer system from the user device, an electronic transaction request; and
  processing, by the computer system, the electronic transaction request using the funding account with the institution based on the linking of the user account and the funding account.

2. A method, comprising:
  receiving, at a computer system of a service provider, a request to activate a funding source for a user account of a user based on a funding account of the user with an institution different from the service provider, wherein the request has associated first information comprising a first number that uniquely identifies the funding account within the institution;
  responsive to the request, the computer system causing a user device associated with a user to display a graphical user interface (GUI) comprising a first area for the user to submit second information associated with the funding account and a second area for the user to submit one or more user-entered digits corresponding to one or more particular digit positions of a current account balance associated with the funding account;
  receiving, by the computer system via the GUI, the second information and the one or more digits associated with the funding account;
  querying, by the computer system, a debit card network associated with the institution for the current account balance associated with the funding account;
  receiving, by the computer system from the debit card network, the current account balance associated with the funding account;
  extracting, by the computer system from the received current account balance, one or more extracted digits corresponding to the one or more particular digit positions;
  authenticating, by the computer system, the funding account of the user by determining that for the first number that uniquely identifies the funding account, the one or more user-entered digits received from the user match the one or more extracted digits extracted from the current account balance, without requiring the user to provide authentication credentials to the service provider for logging in to the funding account with the institution;
  in response to authenticating the funding account, activating, by the computer system, the funding account as a funding source for use by the user account with the service provider;
  receiving, by the computer system from the user device, an electronic transaction request; and
  processing, by the computer system, the electronic transaction request using the funding account based on the activating of the funding account as a funding source.

3. The method of claim 2, further comprising:
causing the user device to display an indication that the funding account was authenticated.

4. The method of claim 2, wherein the second information associated with the funding account includes at least a portion of an identifier for the funding account.

5. The method of claim 4, wherein the identifier for the funding account comprises a debit card number.

6. The method of claim 2, further comprising:
determining that the one or more user-entered digits received from the user do not match the one or more extracted digits extracted from the current account balance, and in response, prompting the user to re-enter the one or more user-entered digits.

7. The method of claim 2, wherein the one or more digits extracted from the current account balance is the decimal portion of the current account balance.

8. The method of claim 2, wherein the first area comprises an HTML text field.

9. The method of claim 2, wherein the second area comprises an HTML text field.

10. The method of claim 2, wherein authenticating the funding account is performed on a same day that the user requested to activate the funding source.

11. The method of claim 2, further comprising transmitting data to the user device that causes display of the GUI, wherein the data comprises web page source code.

12. A non-transitory computer-readable medium having stored thereon instructions executable by a computer system of a service provider to cause the computer system to perform operations comprising:
receiving a request to activate a funding source for a user account of a user based on a funding account of the user with an institution different from the service provider, wherein the request has associated first information comprising a first number that uniquely identifies the funding account within the institution;
responsive to the request, causing a user device associated with a user to display a graphical user interface (GUI) comprising a first area for the user to submit second information associated with the funding account and a second area for the user to submit one or more user-entered digits corresponding to one or more particular digit positions of a current account balance associated with the funding account;
receiving, via the GUI, the second information and the one or more digits associated with the funding account;
querying a bank network associated with the institution for the current account balance associated with the funding account;
receiving, from the bank network, the current account balance associated with the funding account;
extracting, from the received current account balance, one or more extracted digits corresponding to the one or more particular digit positions;
authenticating the funding account of the user by determining that for the first number that uniquely identifies the funding account, the one or more user-entered digits received from the user match the one or more extracted digits extracted from the current account balance, without requiring the user to provide authentication credentials to the service provider for logging in to the funding account with the institution;
in response to authenticating the funding account, activating the funding account as a funding source for use by the user account with the service provider;
receiving, from the user device, an electronic transaction request; and
processing the electronic transaction request using the funding account based on the activation of the funding account as a funding source.

13. The non-transitory computer-readable medium of claim 12, wherein the operations further comprise:
causing the user device to display an indication that the funding account was authenticated.

14. The non-transitory computer-readable medium of claim 12, wherein the second information associated with the funding account includes at least a portion of an identifier for the funding account.

15. The non-transitory computer-readable medium of claim 14, wherein the identifier for the funding account comprises a debit card number.

16. The non-transitory computer-readable medium of claim 12, wherein the causing the user device to display the GUI comprises transmitting, to the user device, a web page source code, and wherein the GUI is configured to display within a web browser of the user device.

17. A system corresponding to a service provider, comprising:
a processor;
a network interface device; and
a non-transitory computer-readable medium having stored thereon instructions executable to cause the system to perform operations comprising:
receiving a request to activate a funding source for a user account of a user based on a funding account of the user with an institution different from the service provider, wherein the request has associated first information comprising a first number that uniquely identifies the funding account within the institution;
responsive to the request, causing a user device associated with a user to display a graphical user interface (GUI) comprising a first area for the user to submit second information associated with the funding account and a second area for the user to submit one or more user-entered digits corresponding to one or more particular digit positions of a current account balance associated with the funding account;
receiving, via the GUI, the second information and the one or more digits associated with the funding account;
querying a debit card network associated with the institution for the current account balance associated with the funding account;
receiving, from the debit card network, the current account balance associated with the funding account;
extracting, from the received current account balance, one or more extracted digits corresponding to the one or more particular digit positions;
authenticating the funding account of the user by determining that for the first number that uniquely identifies the funding account, the one or more user-entered digits received from the user match the one or more extracted digits extracted from the current account balance, without requiring the user to provide authentication credentials to the service provider for logging in to the funding account with the institution;
in response to authenticating the funding account, activating the funding account as a funding source for use by the user account with the service provider; and
causing display of information to the user, via the GUI, indicating that the funding account has been activated.

18. The system of claim 17, wherein the operations further comprise:

receiving, from the user device, an electronic transaction request; and processing, by the computer system, the electronic transaction request using the funding account based on the activation of the funding account as a funding source.

19. The system of claim 17, wherein the operations further comprise:

permitting the user account to perform electronic transactions on a same day that the funding source is activated.

20. The system of claim 17, wherein the operations further comprise:

activating the user account based on activating the funding account as a funding source.

21. The system of claim 17, wherein the causing the user device to display the GUI comprises transmitting, to the user device, a web page source code.

\* \* \* \* \*